US009467241B2

(12) United States Patent
Fischer et al.

(10) Patent No.: US 9,467,241 B2
(45) Date of Patent: Oct. 11, 2016

(54) RADIO STATION GENRE CATEGORIZATION

(71) Applicant: Ford Global Technologies, LLC, Dearborn, MI (US)

(72) Inventors: Joel Fischer, Royal Oak, MI (US); Joey Ray Grover, Madison Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 145 days.

(21) Appl. No.: 14/148,160

(22) Filed: Jan. 6, 2014

(65) Prior Publication Data

US 2015/0195054 A1 Jul. 9, 2015

(51) Int. Cl.

*H04B 1/18* (2006.01)
*H04H 60/65* (2008.01)
*H04H 60/47* (2008.01)

(52) U.S. Cl.

CPC ............. *H04H 60/65* (2013.01); *H04H 60/47* (2013.01)

(58) Field of Classification Search

CPC ......... H04H 60/65; H04H 60/47; H04B 1/16
USPC ......... 455/161.1, 161.2, 161.3, 179.1, 184.1, 455/185.1, 186.1
See application file for complete search history.

(56) References Cited

U.S. PATENT DOCUMENTS 5,416,774 A * 5/1995 Shigematsu ........... H04H 20/30 370/312
5,640,696 A * 6/1997 Ishikawa ............... H03J 1/0008 455/161.1
7,403,755 B2 7/2008 Zehnle et al.
7,580,325 B2 8/2009 Welk et al.
2002/0176372 A1* 11/2002 Ichikawa ............... H04H 20/28 370/254
2003/0036402 A1* 2/2003 Gelsomino ............ H04H 20/28 455/517
2003/0045254 A1* 3/2003 Shibata ...................... 455/179.1
2005/0289591 A1 12/2005 Vermola et al.
2006/0059535 A1 3/2006 D'Avello
2007/0238427 A1* 10/2007 Kraft et al. ................ 455/184.1
2008/0249955 A1* 10/2008 Friedberg ............... G06Q 40/04 705/36 R
2008/0268802 A1* 10/2008 Ricard .................... G10L 25/78 455/179.1
2009/0143067 A1* 6/2009 Kim ......................... H04N 5/44 455/434
2010/0017210 A1 1/2010 Blaker et al.
2010/0289756 A1* 11/2010 Anzures ................ G06F 3/0346 345/173
2010/0291861 A1* 11/2010 Anzures et al. ............. 455/3.01
2011/0028128 A1 2/2011 Cazanas et al.
2011/0065401 A1* 3/2011 Iwasa ..................... H04H 20/26 455/150.1
2011/0185278 A1* 7/2011 Flickinger et al. ........... 715/727
2012/0072869 A1* 3/2012 Odagawa .............. G06F 3/0482 715/810
2012/0209874 A1* 8/2012 Wong ................ G06F 17/30864 707/769
2013/0309978 A1* 11/2013 Weng ......................... 455/67.11
2015/0011163 A1* 1/2015 Brazerol ...................... 455/41.2

* cited by examiner

*Primary Examiner* — Nguyen Vo
(74) *Attorney, Agent, or Firm* — Jennifer M. Stec; Brooks Kushman P.C.

(57) ABSTRACT

A computer-implemented method includes receiving a request from a user to locate a radio station similar to a radio station currently providing content in a predefined genre to a radio receiver; accessing stored genre information compiled from a radio station scan to locate a second radio station providing content in the genre; and tuning the radio receiver to the second radio station.

24 Claims, 7 Drawing Sheets

RADIO STATION GENRE CATEGORIZATION

TECHNICAL FIELD

The present disclosure generally relates to vehicle infotainment systems, and more particularly, to systems and methods of providing radio station genre categorization features.

BACKGROUND

U.S. Pat. No. 7,403,755 generally discloses a monitoring receiver that accepts program preferences from an operator. When active, the receiver automatically monitors alternate frequencies for programming that matches the program preferences, alerts the operator when a match is found, and may switch to a preferred program.

U.S. Patent Publication No. 2006/0059535 generally discloses a receiver such as in an automobile and/or wireless communication device that is configured for a method of playing of live and recorded multimedia content. A desired genre of content is first defined. Both recorded and live content of that desired genre is identified and assembled into a playlist. Live content that is near a beginning of its being played can be rotated to a top of the playlist. In this way, live content, which a user may not have heard is given a priority of recorded content of the user. Since a start time of live content typically will not coincide with an end time of recorded content being played, the receiver can fade-in and fade-out to a the live content or buffer it for delayed play.

U.S. Patent Publication No. 2011/0028128 generally discloses an accessory device, such as a mobile telematics unit, that captures tags for user desired media content items from a content broadcast, such as a digital radio broadcast or television broadcast. Each tag provides one or more parameters for identification of a song or other audio selection. The accessory device sends each tag over a mobile communications network air interface, with an identifier of an account of a mobile communications network subscriber. A server receives such tag transmissions and compiles a list of one or more tags directly from the accessory device, for the subscriber on the identified mobile service account. In some situations, the server generates a playlist from the stored list of tags and communicates at least a portion of the playlist to a personal media device, upon access by the personal media device to the subscriber's account.

SUMMARY

In a first illustrative embodiment, a computer-implemented method includes receiving a request from a user to locate a radio station similar to a radio station currently providing content in a predefined genre to a radio receiver; accessing stored genre information compiled from a radio station scan to locate a second radio station providing content in the genre; and tuning the radio receiver to the second radio station.

In a second illustrative embodiment, a system includes at least one controller configured to receive a request from a user to locate a radio station similar to a radio station currently providing content in a predefined genre to a radio receiver; access stored genre information compiled from a radio station scan to locate a second radio station providing content in the genre; and tune the radio receiver to the second radio station.

In a third illustrative embodiment, a non-transitory computer readable medium includes instructions configured to cause at least one controller to receive a request from a user to locate a radio station similar to a radio station currently providing content in a predefined genre to a radio receiver; access stored genre information compiled from a radio station scan to locate a second radio station providing content in the genre; and tune the radio receiver to the second radio station.

DETAILED DESCRIPTION

Figure 1:
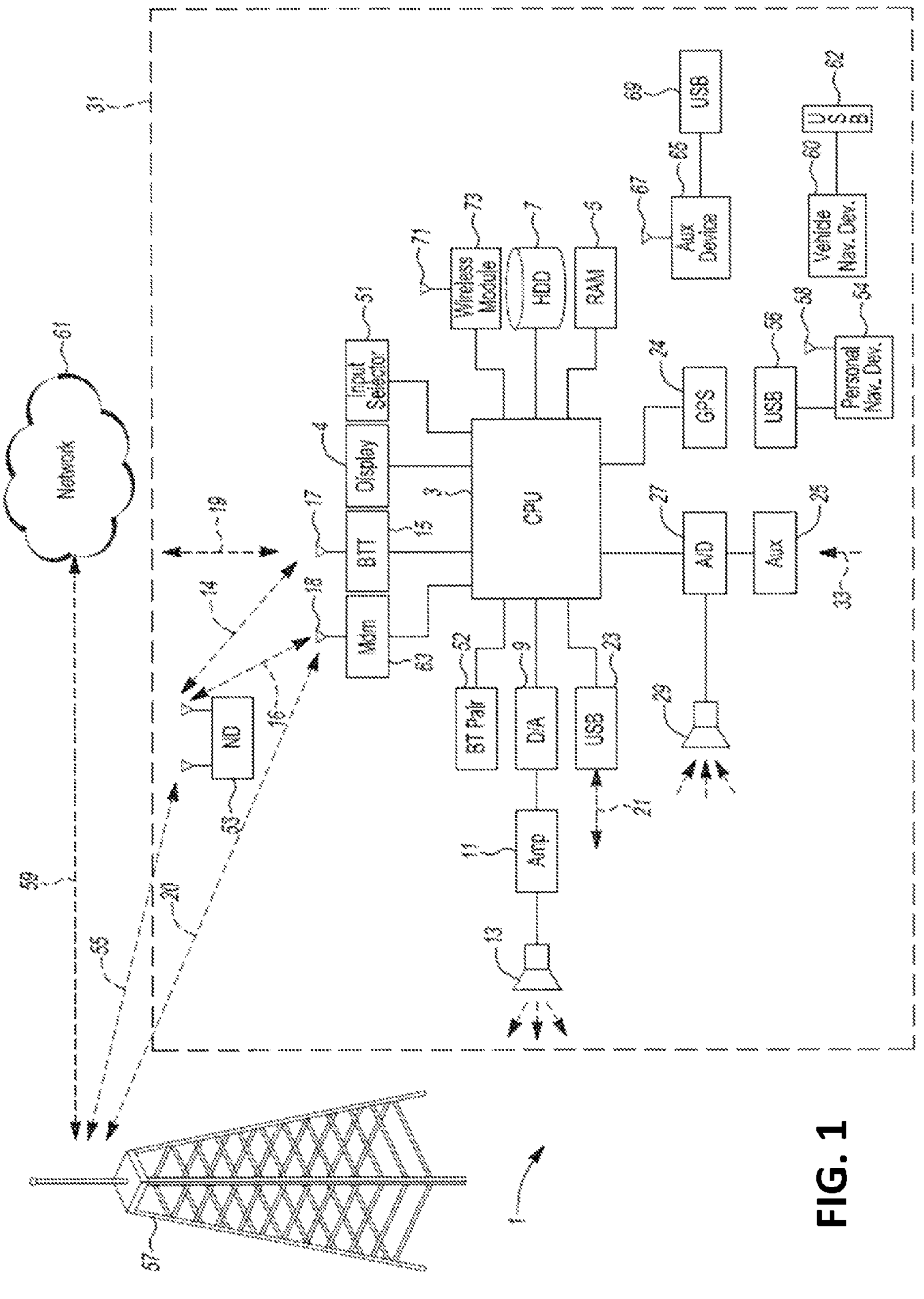
FIG. 1 is an exemplary block topology of a vehicle infotainment system implementing a user-interactive vehicle information display system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A user may not know what content is being provided by a radio station until the user tunes a radio receiver to that station. Moreover, once the radio receiver is tuned to a station, it may be difficult for the user to determine more generally what genre of content is typically provided by that station.

Radio data system (RDS) is a communications protocol standard for embedding small amounts of digital information in conventional FM radio broadcasts, and standardizes several types of information transmitted, including time, station identification and program information. A vehicle system may scan the FM frequency band to retrieve RDS data transmitted by local FM stations. Based on the received RDS data, the vehicle system may compile a listing of genres and stations within each genre. This information may be maintained by the vehicle system, and utilized in the radio user interface to support additional genre-related station browsing features.

As one example, the vehicle user interface may include a feature to allow for browsing of radio stations according to genre. The user interface may provide a listing of genres based on the RDS data for a user to select. When selected, the user interface may further provide a listing of the stations within the selected genre for the user to select. As another example, the user interface may provide a find similar user interface element to allow a user to tune to another radio station indicated as being within the same genre as the currently tuned radio station.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
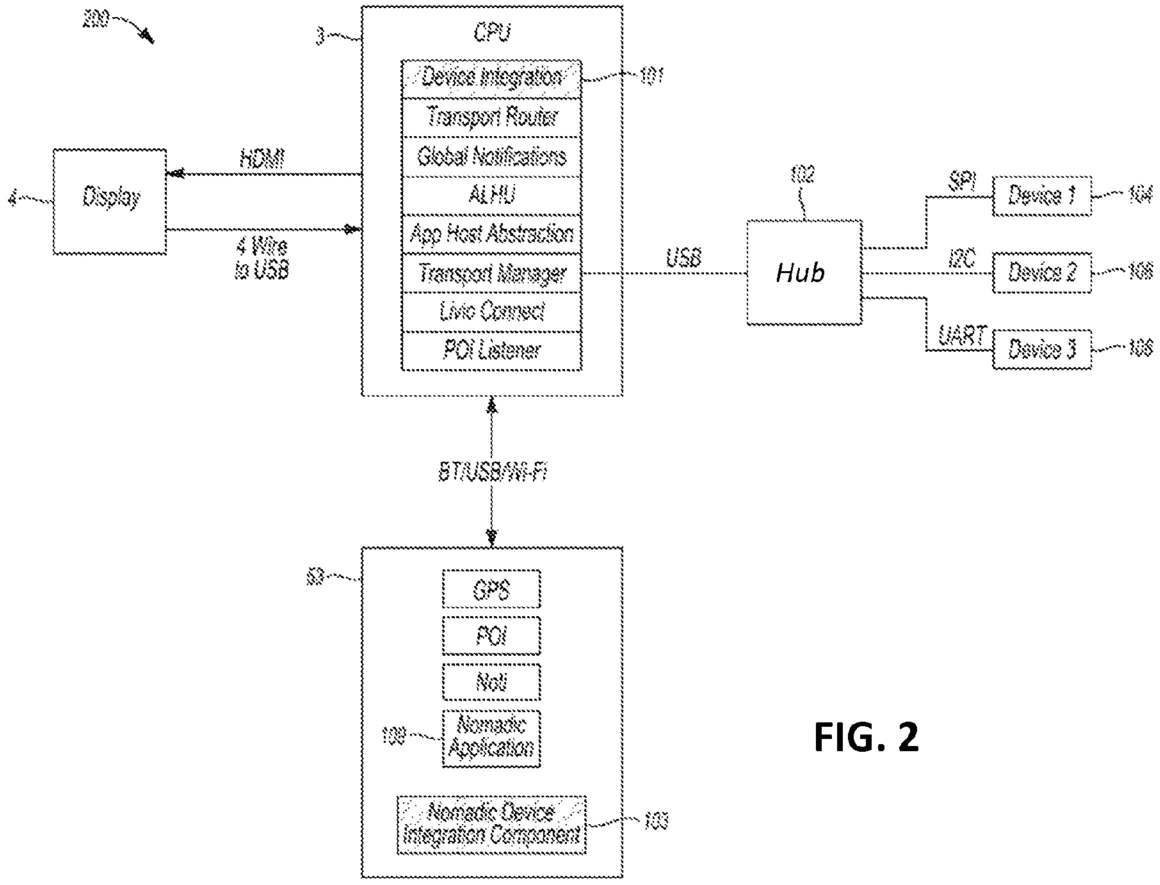
FIG. 2 is an exemplary block topology of an example system for integrating one or more nomadic devices with an infotainment system.

FIG. 2 is an exemplary block topology of a system for integrating one or more connected devices with the vehicle based computing system 1 (VCS). To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 to take advantage of the services provided by the device integration framework 101. Applications executed by the nomadic device 53 may accordingly utilize the device integration client component 103 to interact with the CPU 3 via the device integration framework 101. As one example, a music player application on the nomadic device 31 may interact with the CPU 3 to provide streaming music through the speaker 13 or stereo system output of the VCS 1. As another example, a navigation application on the nomadic device 31 may interact with the CPU 3 to provide turn-by-turn directions for display on the screen 4 of the VCS 1.

The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

A VCS 1 may include one or more receivers configured to receive audio content. For example, the VCS 1 may include an FM radio receiver configured to receive frequency-modulated radio transmissions from radio stations broadcasting within the frequency band of 87.5 to 108.0 MHz. In addition to receiving audio content, the VCS 1 may be further configured to receive metadata regarding the radio stations providing the audio content. For example, the VCS 1 may be configured to scan the FM frequency band to retrieve RDS data transmitted by the radio stations.

The metadata may include, for example, station identification (e.g., via the RDS data program identification (PI) or program service (PS) data elements) and genre information indicative of the types of audio content provided by the radio station (e.g., via the RDS data program type (PTY) data element). These genres may include, as some non-limiting examples: news, information, sports, talk, rock, classic rock, adult hits, soft rock, top 40, country, oldies, soft, nostalgia, jazz, classical, rhythm and blues, soft rhythm and blues, language, religion music, religious talk, personality, public, college, Spanish talk, Spanish music, hip hop, unassigned, weather, emergency test or emergency. The metadata may also include information regarding the specifics of the audio content currently being provided, such as the song, artist, or radio show currently being broadcast (e.g., via the RDS data radio text (RT) data element).

In some cases, a system may utilize a single radio receiver. In such cases, the metadata content may be received using the same receiver used to receive the audio content. In other cases, a system may include multiple receivers. As one possibility, the VCS 1 may include a first receiver to receive the audio content, and a second receiver to scan the available stations for genre information. The second receiver may be implemented, for example, as a module connected to the VCS 1 via the multiport connector hub 102. As another possibility, the VCS 1 may utilize multiple receivers for metadata retrieval to increase the speed of the scanning of available stations (e.g., both an internal receiver not currently being used to receive audio content and also a receiver module connected via the hub 102).

Based on the received audio metadata data, the VCS 1 may compile a listing of genres and stations within each genre. Continuing to use RDS as an example, each station may be associated with a genre corresponding to the PTY code received during the FM frequency scan. The genre information compiled based on the station scan may be maintained by the VCS 1.

The VCS 1 may determine whether to rescan the radio stations for updated metadata based on various triggers. As one possibility, the VCS 1 may be configured to initiate a station scan when radio functionality of the VCS 1 is invoked. As another possibility, the VCS 1 may be configured to initiate a station scan if there is no currently cached station metadata information, or if the currently cached station metadata information is older than a predetermined amount of time (e.g., 24 hours old, 30 days old, etc.). As yet a further possibility, the VCS 1 may be configured to maintain an indication of a geographic location of the vehicle 31 when the scan was last performed (e.g. using the GPS input 24), and may initiate a station scan if the vehicle has moved at least a threshold distance from the geographic location of when a scan was last performed (e.g., 25 miles, 50 miles, etc.).

Using the genre information, the VCS 1 may be configured to provide additional genre-related station browsing features in the radio user interface. These additional features may include a user interface for browsing radio stations by genre, as well as a user interface for finding a radio station playing content in the same genre as the radio station to which the VCS 1 is currently tuned.

Figure 3A:
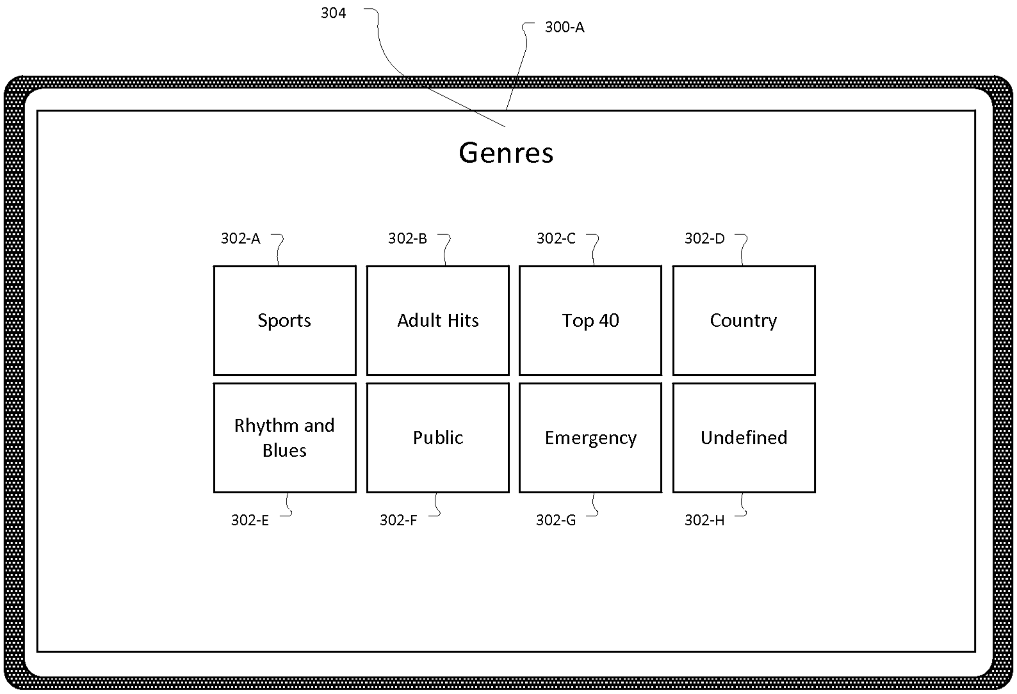
FIG. 3A illustrates an exemplary user interface for selection of a genre of radio station.

FIG. 3A illustrates an exemplary user interface 300-A for selection of a genre of radio station. The user interface 300-A may be displayed, for example, on a display screen 4 of the VCS 1. Based on the compiled genre information, the user interface 300-A may be configured to present a listing of genre user interface elements 302 that correspond to the available genres of radio station. The user interface 300-A may also include or update a label 304 to indicate to the user that the current user interface 300-A facilities selection of a genre of radio station. In the exemplary user interface, the genre user interface elements 302 include a sports genre element 302-A, an adult hits genre element 302-B, a top 40 genre element 302-C, a country genre element 302-D, a rhythm and blues genre element 302-E, a public radio genre element 302-F, an emergency information genre element 302-G, and an unknown genre element 302-H (e.g., for those stations for which a genre was specified as unknown, was not specified, or otherwise could not be identified). While the user interface 300-A includes eight genre elements 302-A through genre element 302-H, it should be noted that based on the compiled genre information, more, fewer, or different genre elements 302 may be included in the user interface 300-A.

The genre user interface elements 302 may be selectable by a user to allow the user to choose from stations in the selected radio station genre. For example, selection of the sports genre element 302-A may cause the VCS 1 to present a listing of available sports stations, and selection of the rhythm and blues genre element 302-E may cause the VCS 1 to present a listing of available rhythm and blues stations.

As illustrated, only genre user interface elements 302 for which stations exist may be appear in the user interface 300-A. In other cases, the user interface 300-A may include genre user interface elements 302 for various possible genres, regardless of whether any radio stations are associated with the genre. In such cases, the genre user interface elements 302 corresponding to genres in which no stations are present may be included in the user interface 300-A but in a disabled form, such that they may not cause the VCS 1 to present a listing of available stations within the genre. Or, upon selection the user interface 300-A may provide a notification message indicating that no stations are presently available within the selected genre.

Figure 3B:
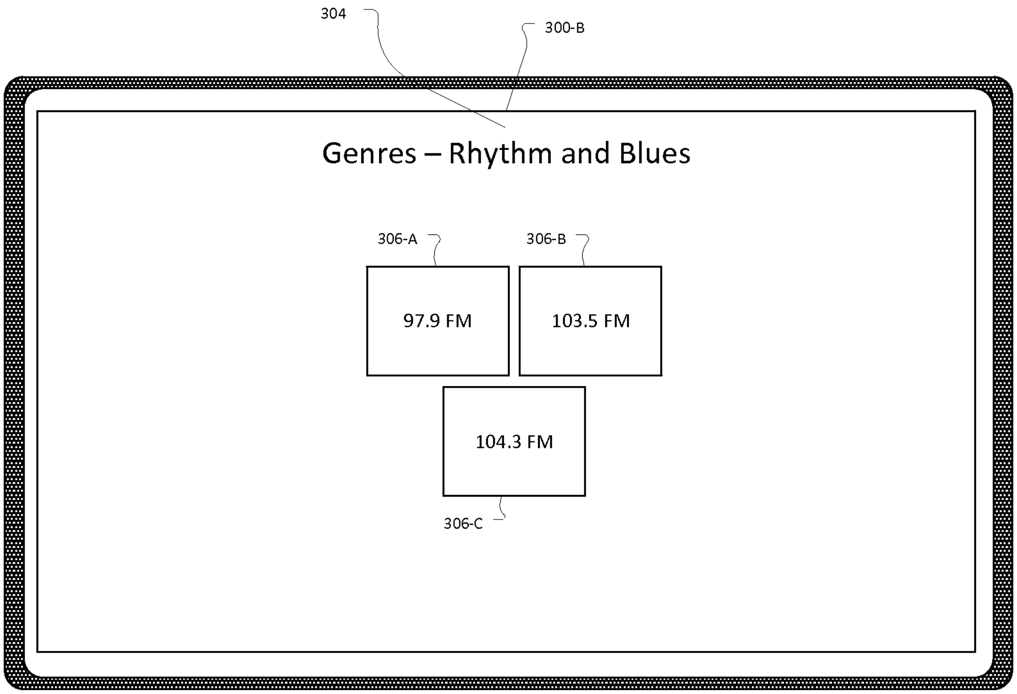
FIG. 3B illustrates an exemplary user interface for selection of a radio station within a selected genre.

FIG. 3B illustrates an exemplary user interface 300-B for selection of a radio station within a selected genre. The user interface 300-B may be configured to present a listing of radio station user interface elements 306 that are included in the genre corresponding to a genre element 302 selected from the user interface 300-A. The user interface 300-B may also be configured to include or update a label 304 in the user interface 300-B to be indicative of the selected genre.

For example, the user interface 300-B may be provided upon receipt of user selection of the rhythm and blues genre element 302-E from the user interface 300-A. The VCS 1 may identify based on the compiled genre information that the stations 97.9 FM, 103.5 FM, and 104.3 FM fall within the rhythm and blues genre. Accordingly, the VCA 1 may include a radio station user interface element 306-A corresponding to 97.9 FM, a radio station user interface element 306-B corresponding to 103.5 FM, and a radio station user interface element 306-C corresponding to 104.3 FM.

The radio station user interface elements 306 may be selectable by a user to allow the user to choose to listen to the selected radio station. For example, selection of the radio station user interface element 306-A may cause the VCS 1 to tune the radio to 97.9 FM, and selection of the radio station user interface element 306-C may cause the VCS 1 to tune the radio to 104.3 FM.

Figure 3C:
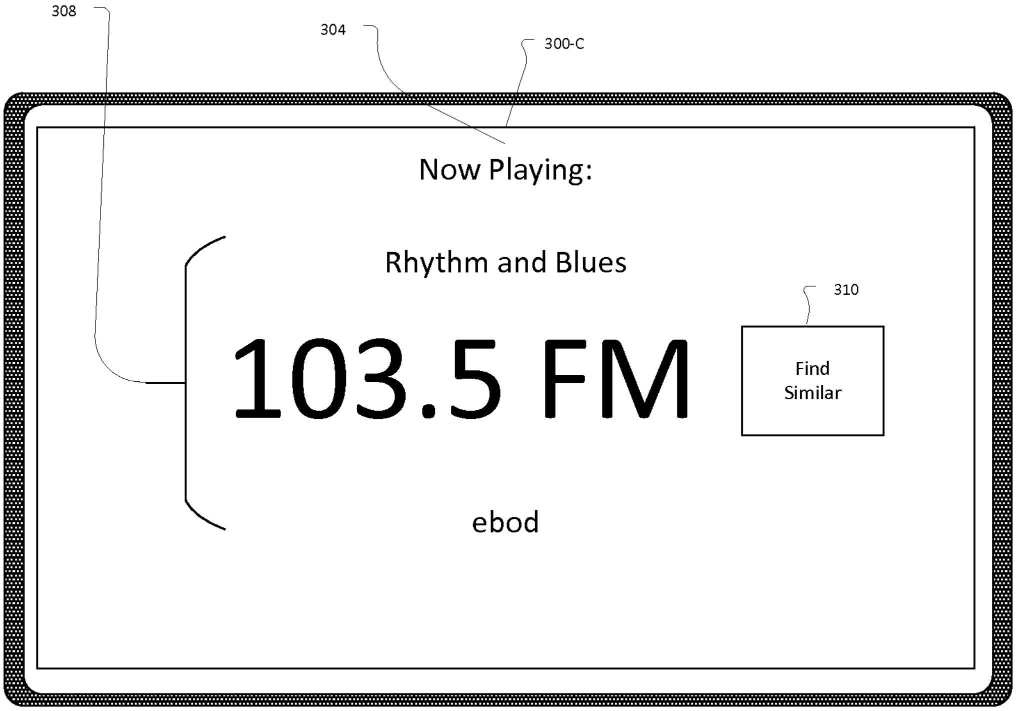
FIG. 3C illustrates an exemplary user interface of a radio application tuned to a radio station and including a find similar feature.

FIG. 3C illustrates an exemplary user interface 300-C of a radio application tuned to a radio station and including a find similar feature 310. The user interface 300-C may be configured to present details of the currently-tuned radio station in one or more radio information interface elements 308. The information included in the elements 308 may include, for example, an indication of the currently tuned radio station, information regarding the genre of the radio station, and information regarding the content presently being provided by the station such as song, artist, radio show, etc. (e.g., determined according to retrieved RDS data, as one example). The user interface 300-C may also be configured to include or update a label 304 in the user interface 300-C to indicate that the user interface 300-C represents information regarding the currently tuned radio station.

The user interface 300-C may be provided based on selection of a radio station user interface element 306 from the user interface 300-B. For example, the user interface 300-C may be provided upon receipt of user selection of the radio station user interface element 306-C associated with 104.3 FM from the user interface 300-B.

It should also be noted that the user interface 300-C may be displayed in situations other than resulting from user selection of the radio station user interface element 306-C. For example, if only one radio station is included in a genre, then selection of a genre user interface element 302 form the user interface 300-A for that genre may result in the VCS 1 providing the user interface 300-C for that radio station, without requiring the user to select the only available choice from the user interface 300-B.

The user interface 300-C may be displayed based on other user interface flows as well. As some possibilities, the user interface 300-C may be displayed in response to a user selecting a radio station preset, in response to the user seeking or scanning to the radio station, or in response to the user utilizing a direct tune feature to direct the radio to the radio station.

Moreover, the user interface 300-C may also include a find similar user interface element 310. The find similar user interface element 310 may be configured to allow a user to easily tune to another radio station in the same genre as the currently tuned radio station. Upon receipt of user selection of the find similar user interface element 310, the VCS 1 may identify a similar station based on the compiled genre information, and may tune the radio to the identified similar radio station.

For example, as mentioned above with respect to the user interface 300-B, in the illustrated example the genre information includes two other stations in the same genre as the currently tuned radio station (i.e., 97.9 FM and 104.3 FM are also in the rhythm and blues genre along with 104.3 FM). Thus, the VCS 1 may be tune the radio to either 97.9 FM or 104.3 FM. As one possibility, the VCS 1 may select the next station in frequency order. For instance, if the radio is tuned to 103.5 FM, then selecting the find similar user interface element 310 may tune the radio to 104.3 FM, selecting the find similar user interface element 310 again may tune the radio to 97.9 FM, and selecting the find similar user interface element 310 again may tune the radio back to 103.5 FM.

A user may accordingly use the find similar user interface element 310 to cycle through the available programming within a particular genre of music, without having to know which radio stations play content in what genre. Moreover, the user may be able to automatically browse content in an unfamiliar city, also without having to know which stations play what genres of content.

Figure 4:
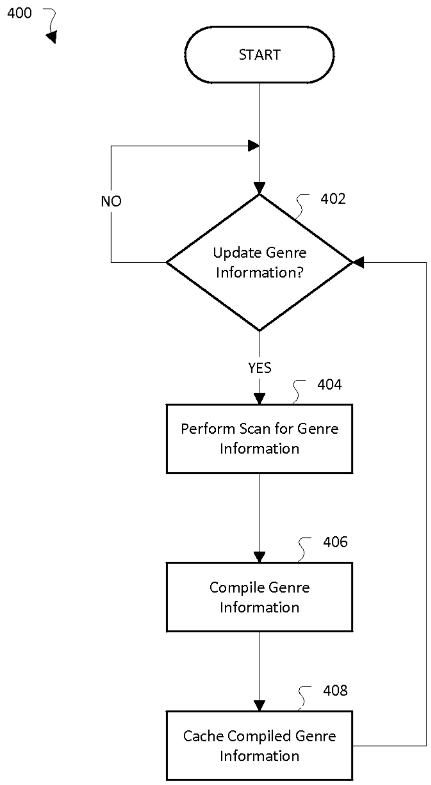
FIG. 4 illustrates an exemplary process for gathering radio genre information.

FIG. 4 illustrates an exemplary process for gathering radio genre information. As one possibility, the process 400 may be implemented using software code contained within the VCS 1. In other embodiments, the process 400 may be implemented in other vehicle controllers, or distributed amongst multiple vehicle controllers.

At decision point 402, the VCS 1 determines whether to capture updated genre information. For example, the VCS 1 may be configured to initiate a station scan when radio functionality of the VCS 1 is invoked, or when radio functionality requiring genre information is invoked. As another possibility, the VCS 1 may be configured to initiate a station scan if there is no currently cached station metadata information, or if the currently cached station metadata information is older than a predetermined amount of time (e.g., 24 hours old, 30 days old, etc.). As yet a further possibility, the VCS 1 may be configured to maintain an indication of a geographic location of the vehicle 31 when the scan was last performed, and may initiate a station scan if the vehicle has moved at least a threshold distance from the geographic location of when a scan was last performed (e.g., 25 miles, 50 miles, etc.). If the VCS 1 determines that updated genre information should be captures, control passes to block 404. Otherwise, control remains at decision point 402.

At block 404, the VCS 1 performs a scan for genre information. For example, the VCS 1 may be configured to utilize one or more radio receivers to scan the FM frequency band to retrieve RDS data transmitted by the radio stations. The metadata may include, for example, station identification (e.g., via the RDS data program identification (PI) or program service (PS) data elements) and genre information indicative of the types of audio content provided by the radio station (e.g., via the RDS data program type (PTY) data element). These genres may include, as some non-limiting examples: news, information, sports, talk, rock, classic rock, adult huts, soft rock, top 40, country, oldies, soft, nostalgia, jazz, classical, rhythm and blues, soft rhythm and blues, language, religion music, religious talk, personality, public, college, Spanish talk, Spanish music, hip hop, unassigned, weather, emergency test or emergency. The metadata may also include information regarding the specifics of the audio content currently being provided, such as the song, artist, or radio show currently being broadcast (e.g., via the RDS data radio text (RT) data element).

At block 406, the VCS 1 compiles the genre information. For example, based on the received audio metadata data, the VCS 1 may compile a listing of genres and stations within each genre. Continuing to use RDS as an example, each station may be associated with a genre corresponding to the PTY code received during the FM frequency scan.

At block 408, the VCS 1 caches the compiled genre information. The compiled genre information may accordingly be maintained by the vehicle system, and utilized in the radio user interface to support additional genre-related station browsing features. Using the genre information, the VCS 1 may be configured to provide additional genre-related station browsing features in the radio user interface. These additional features may include, as some examples, a user interface for browsing radio stations by genre, as well as a user interface for finding a radio station playing content in the same genre as the radio station to which the VCS 1 is currently tuned. After block 408, control passes to decision point 402.

Figure 5:
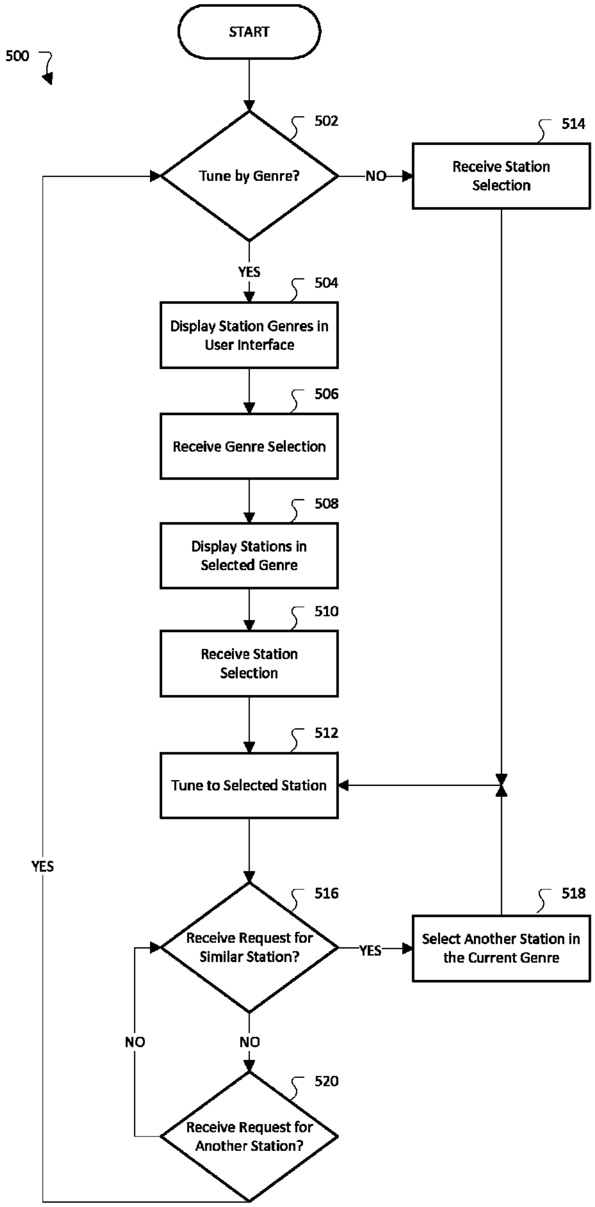
FIG. 5 illustrates an exemplary process for selection of radio stations utilizing genre-related features.

FIG. 5 illustrates an exemplary process for selection of radio stations utilizing genre-related features. As with the process 400, the process 500 may be implemented using software code contained within the VCS 1. In other embodiments, the process 500 may be implemented in other vehicle controllers, or distributed amongst multiple vehicle controllers.

At decision point 502, the VCS 1 determines whether the user wishes to select a radio station by genre. For example, the user may select an element from a radio user interface 300 requesting to tune by genre. If the user wishes to select a radio station by genre, control passes to block 504. Otherwise, control passes to block 514.

At block 504, the VCS 1 displays a listing of station genres. For example, the VCS 1 may display an exemplary user interface 300-A for selection of a genre of radio station, such as the one discussed above with respect to FIG. 3A. The user interface 300-A may be displayed, for example, on a display screen 4 of the VCS 1. The user interface 300-A may present, for example, a listing of genre user interface elements 302 that correspond to the available genres of radio station as determined based on the genre information, as well as a label 304 to indicate to the user that the current user interface 300-A facilities selection of a genre of radio station.

At block 506, the VCS 1 receives a genre selection from the user interface. For example, the genre user interface elements 302 of the user interface 300-A may be selectable by a user, and the user may select one of the genre user interface elements 302 from the user interface 300-A.

At block 508, the VCS 1 displays stations in the selected genre. For example, the VCS 1 may display an exemplary user interface 300-B for selection of a radio station within a selected genre, such as the one discussed above with respect to FIG. 3B. The user interface 300-B may be configured to present a listing of radio station user interface elements 306 that correspond to a genre element 302 selected from the user interface 300-A. The user interface 300-B may also be configured to include or update a label 304 in the user interface 300-B to be indicative of the selected genre.

At block 510, the VCS 1 receives a station selection from the displayed stations. For example, the radio station user interface elements 306 of the user interface 300-B may be selectable by a user, and the user may select one of the radio station user interface elements 306 from the user interface 300-B.

At block 512, the VCS 1 tunes to the selected station. For example, upon receipt of user selection of one of the radio station user interface element 306 from the user interface 300-B, the VCS 1 may set a receiver of the VCS 1 to receive audio content from the selected radio station, and may provide the user interface 300-C to indicate to the user that the selected station is now playing. After block 512, control may pass to decision point 516.

At block 514, the VCS 1 receives a station selection through a mechanism other than via genre information. For example, the user may select a radio station preset, may utilize a seek or scan radio feature to browse to a station, or may utilizing a direct tune feature to directly enter a station frequency into the VCS 1. After block 514, control may pass to block 512 to tune to the selected station.

At decision point 516, the VCS 1 determines whether the user requests the radio to tune to a similar station. For example, as discussed above with respect to FIG. 3C, the VCS 1 may include a find similar user interface element 310 in the user interface 300-C to allow a user to easily tune to another radio station in the same genre as the currently tuned radio station. If the user selects the find similar user interface element 310, control passes to block 518. Otherwise, control passes to decision point 520.

At block 518, the VCS 1 tunes the radio to an identified similar radio station. For example, the VCS 1 may identify a similar station based on the compiled genre information. For example, based on the genre information, the VCS1 may select another radio station in the same genre as the currently tuned radio station. After block 518, control passes to block 512 to tune to the selected station.

At decision point 520, the VCS 1 determines whether the user requests the radio to tune to another station. For example, user may select an element from a radio user interface 300 indicating that the user wishes to tune to another station. If the user requests to tune to another station, control passes to decision block 502. Otherwise, control passes to decision point 516.

Referring again to FIGS. 4-5, the vehicle and its components illustrated in FIG. 1 and FIG. 2 are referenced throughout the discussion of the processes 400 and 500 to facilitate understanding of various aspects of the present disclosure. The processes 400 and 500 may be implemented through a computer algorithm, machine executable code, or software instructions programmed into a suitable programmable logic device(s) of the vehicle, such as the vehicle control module, the hybrid control module, another controller in communication with the vehicle computing system, or a combination thereof. Although the various steps shown in the process 500 and 600 appear to occur in a chronological sequence, at least some of the steps may occur in a different order, and some steps may be performed concurrently or not at all.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method, comprising:

displaying, based on stored genre information compiled from a radio station scan, a plurality of genre user interface elements listing available genres of radio station;

receiving a selection of a genre from the available genres;

when the selected genre includes multiple stations, displaying a listing of radio stations included in the genre; and when the selected genre includes a single radio station, automatically tuning a radio receiver to the single radio station.

2. The method of claim 1, further comprising performing the radio station scan by the radio receiver.

3. The method of claim 1, further comprising performing the radio station scan based on at least one of: (i) a determination that the stored genre information is older than a predetermined amount of time; (ii) a determination that the radio receiver has moved at least a threshold distance from a geographic location of when a scan was last performed; and (iii) receipt of a user request to refresh stored genre information.

4. The method of claim 1, further comprising:
receiving a selection of one of the radio stations from the listing of radio stations; and
tuning the radio receiver to the selected one of the radio stations.

5. The method of claim 4, further comprising:
displaying information of the selected one of the radio stations currently providing content in the selected genre to the radio receiver and a control for tuning to a next station of the selected genre;
responsive to receiving input to the control, accessing the genre information to locate a second radio station providing content in the selected genre; and
tuning the radio receiver to the second radio station.

6. The method of claim 5, further comprising identifying the second radio station providing content in the genre as a next station in frequency order providing content in the genre.

7. The method of claim 5, further comprising:
responsive to receiving second input to the control, accessing the stored genre information compiled from a radio station scan to locate a third radio station providing content in the genre; and
tuning the radio receiver to the third radio station.

8. The method of claim 1, wherein the genre information compiled from a radio station scan includes radio data system information embedded in frequency modulated radio broadcasts.

9. The method of claim 1, further comprising:
when the selected genre includes multiple stations, displaying the listing of radio stations included in the genre without changing the tuning of the radio receiver; and
when the selected genre includes a single radio station, automatically tuning a radio receiver to the single radio station without displaying the listing of radio stations.

10. A system, comprising:
a radio receiver;
a display; and
at least one controller configured to
provide, to the display based on stored genre information compiled from a radio station scan, a user interface including a plurality of genre user interface elements listing available genres of radio station,
receive, from the display, a selection of a genre from the available genres of radio station,
when the selected genre includes multiple stations, provide, to the display, a listing of radio stations included in the genre; and
when the selected genre includes a single radio station, automatically tune the radio receiver to the single radio station.

11. The system of claim 10, the at least one controller further configured to perform the radio station scan by the radio receiver.

12. The system of claim 10, the at least one controller further configured to perform the radio station scan based on at least one of: (i) a determination that the stored genre information is older than a predetermined amount of time; (ii) a determination that the radio receiver has moved at least a threshold distance from a geographic location of when a scan was last performed; and (iii) receipt of a user request to refresh stored genre information.

13. The system of claim 10, the at least one controller further configured to:
receive, from the display, a selection of one of the radio stations from the listing of radio stations; and
tune the radio receiver to the selected one of the radio stations.

14. The system of claim 13, the at least one controller further configured to:
display, information of the selected one of the radio stations currently providing content in the selected genre to the radio receiver and a control for tuning to a next station of the selected genre;
responsive to receiving input from the display indicative of selection of the control, access the genre information to locate a second radio station providing content in the selected genre; and
tune the radio receiver to the second radio station.

15. The system of claim 14, the at least one controller further configured to identify the second radio station providing content in the genre as a next station in frequency order providing content in the genre.

16. The system of claim 14, the at least one controller further configured to:
responsive to receipt of second input to the control, access the stored genre information compiled from a radio station scan to locate a third radio station providing content in the genre; and
tune the radio receiver to the third radio station.

17. The system of claim 10, wherein the genre information compiled from a radio station scan includes radio data system information embedded in frequency modulated radio broadcasts.

18. A non-transitory computer readable medium comprising instructions that, when executed by at least one controller, cause the at least one controller to:
provide, based on stored genre information compiled from a radio station scan, a user interface including a plurality of genre user interface elements listing available genres of radio station;
receive a selection of a genre from the available genres of radio station;
when the selected genre includes multiple stations, displaying a listing of radio stations included in the genre; and
when the selected genre includes a single radio station, automatically tuning a radio receiver to the single radio station.

19. The computer readable medium of claim 18, further comprising instructions configured to cause the at least one controller to perform the radio station scan by the radio receiver.

20. The computer readable medium of claim 18, further comprising instructions configured to cause the at least one controller to perform the radio station scan based on at least one of: (i) a determination that the stored genre information is older than a predetermined amount of time; (ii) a determination that the radio receiver has moved at least a threshold distance from a geographic location of when a scan was last performed; and (iii) receipt of a user request to refresh stored genre information.

21. The computer readable medium of claim 18, further comprising instructions configured to cause the at least one controller to:

receive a selection of one of the radio stations from the listing of radio stations; and tune the radio receiver to the selected one of the radio stations.

22. The computer readable medium of claim 21, further comprising instructions configured to cause at least one controller to:

display information of the selected one of the radio stations currently providing content in the selected genre to the radio receiver and a control for tuning to a next station of the selected genre;

responsive to receiving input to the control, access the genre information to locate a second radio station providing content in the selected genre; and tune the radio receiver to the second radio station.

23. The computer readable medium of claim 22, further comprising instructions configured to cause the at least one controller to identify the second radio station providing content in the genre as a next station in frequency order providing content in the genre.

24. The computer readable medium of claim 22, further comprising instructions configured to cause the at least one controller to:

responsive to receipt of second input to the control, access the stored genre information compiled from a radio station scan to locate a third radio station providing content in the genre; and tune the radio receiver to the third radio station.

* * * * *